April 14, 1953  E. E. NOFZINGER  2,634,697
APPARATUS FOR SOLDERING
Original Filed Aug. 21, 1947  3 Sheets-Sheet 1

EARL E. NOFZINGER
INVENTOR.

BY
Richard A. Parsons
Atty.

EARL E. NOFZINGER
INVENTOR.

EARL E. NOFZINGER
INVENTOR.

Patented Apr. 14, 1953

2,634,697

UNITED STATES PATENT OFFICE 2,634,697

APPARATUS FOR SOLDERING

Earl E. Nofzinger, Greenville, Mich., assignor to Gibson Refrigerator Company, Greenville, Mich., a corporation of Michigan Original application August 21, 1947, Serial No. 769,895, now Patent No. 2,573,594, dated October 30, 1951. Divided and this application April 1, 1949, Serial No. 84,867

4 Claims. (Cl. 113—99)

This invention relates to apparatus for soldering two or more metal parts together, and more particularly to clamping devices for holding the parts in proper relationship while heat is applied to melt the solder.

The principal object of the present invention is to provide a novel clamping device for holding relatively large parts together in proper relationship while they are being soldered together.

A still further object of the invention is to provide a clamp formed of spaced apart bars to permit heat to be applied between the bars to the parts to be soldered together.

A still further object of the invention is to provide a clamping mechanism for use in a gas heated soldering machine.

These objects will more fully appear in the following specification, when read in connection with the accompanying drawings, wherein.

The present invention is a clamping device for holding a plurality of parts in proper relationship while they are being soldered together. It is particularly adapted for use in a soldering machine of the character shown in my copending application for a Soldering Machine, Serial No. 769,895, filed August 21, 1947, now Patent No. 2,573,594, of which the present application is a division.

In a general way the clamping apparatus comprising the present invention is composed of an upper clamping member 10 and a lower clamping member 11. In the present case the clamping members are designed to hold certain parts of an evaporator for a refrigerator. However, the type of structure which they are designed to hold is not material.

Figure 6:
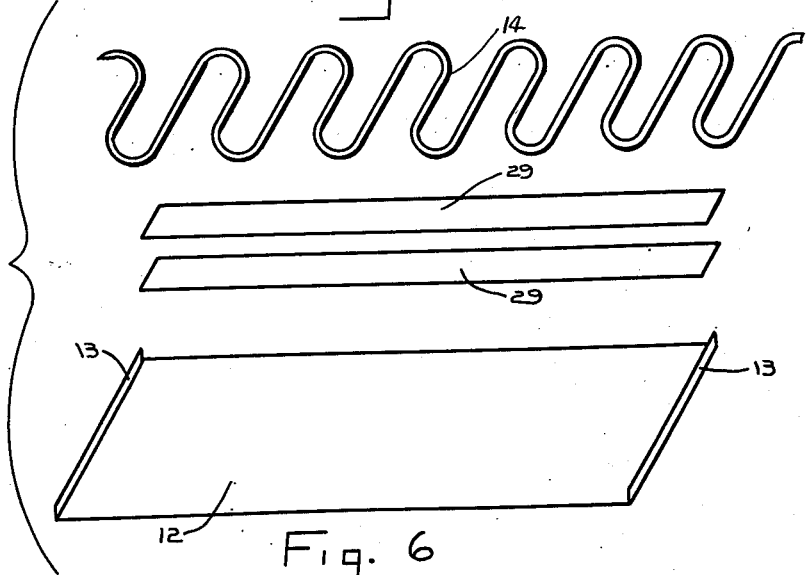
Figure 6 is an exploded pictorial view showing an arrangement of parts to be soldered together and strips of solder in the relative order in which they are placed together.

The specific evaporator shown comprises an elongated plate 12 having flanges 13 turned up at the ends thereof. Soldered to the plate 12 is a refrigerant conduit 14. The refrigerant conduit is formed of tubing of relatively small cross-section bent into sinuous form, as shown in Figure 6. It will be noted that the plate 12 is planar except for the flanges 13. The convolutions of conduit 14 are, therefore, arranged in a common plane so that the conduit can be soldered to the plate 12 in intimate contact therewith.

Figure 1:
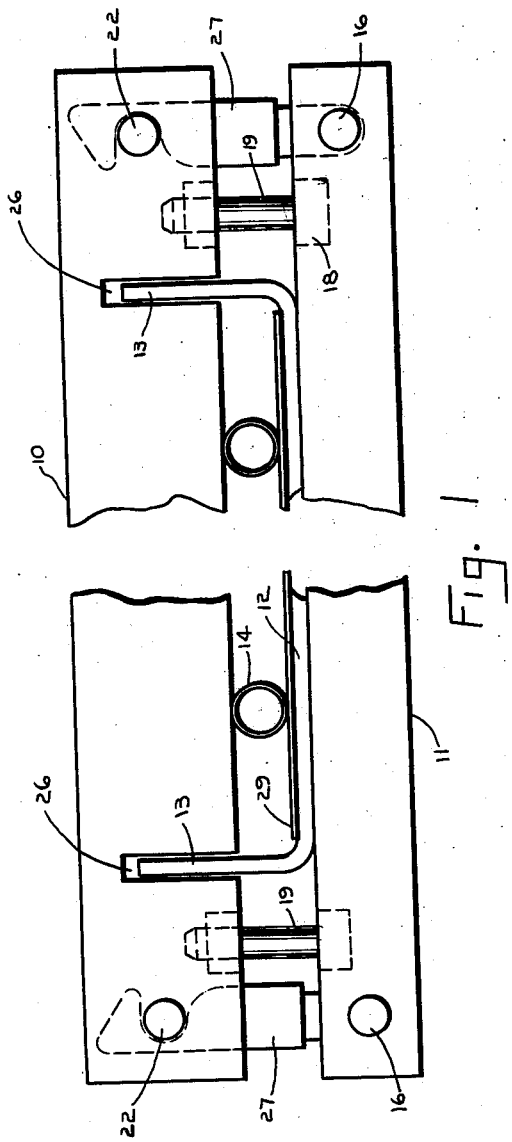
Figure 1 is a fragmentary side elevational view of the invention.
Figure 2:
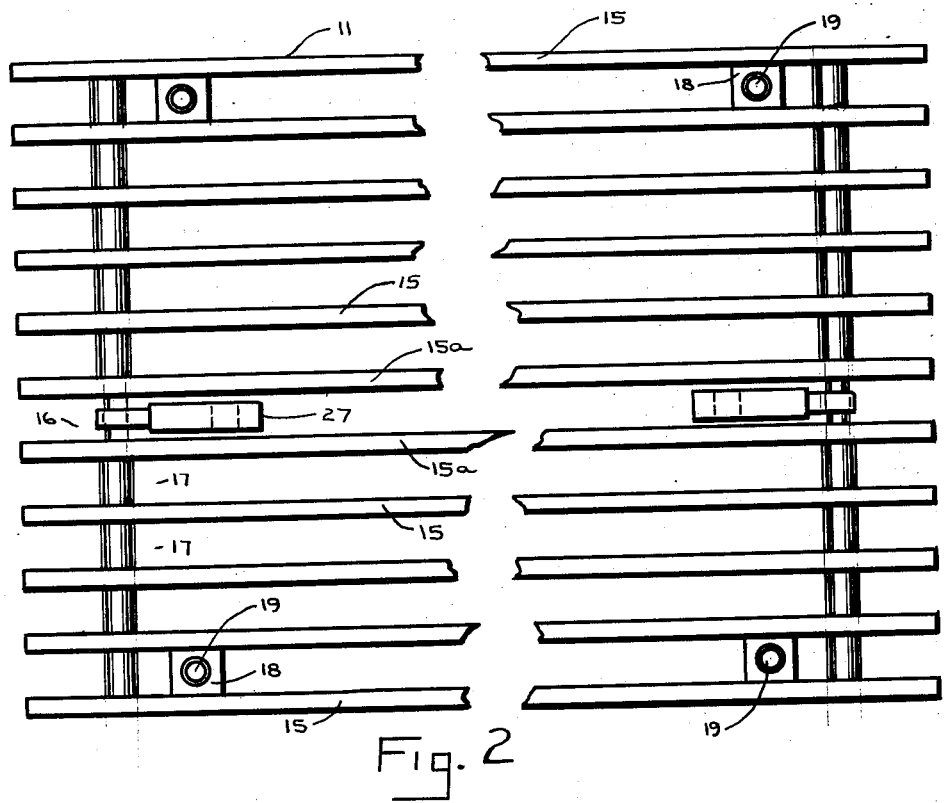
Figure 2 is a fragmentary plan view of the lower clamping member.
Figure 3:
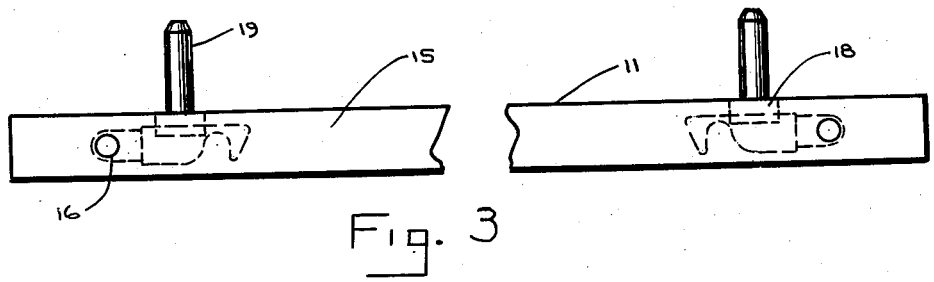
Figure 3 is a fragmentary side elevational view of the same.

The lower clamping member is shown in detail in Figures 2 and 3. It comprises a grid of iron bars 15 and 15a of rectangular cross-section. These bars are all identical. The bars 15 and 15a are connected together by a pair of transverse rods 16 which extend through aligned openings 17 in the bars. The bars are spaced equidistantly from each other by means of short cylindrical sleeves 17 placed upon the rods 16 during the assembly of the clamping member. The sleeves 17 are omitted between the bars 15a and are replaced by hooks 27. The hooks 27 are pivotally mounted on the rods 16.

Four rectangular brackets 18 are located between the outermost pairs of bars 15 adjacent the four corners of the clamping member 11. The brackets are preferably welded to the adjacent bars 15. Each bracket carries a locating pin 19 which extends upwardly therefrom. Preferably the pins 19 are welded to or made integral with the brackets 18.

Figure 4:
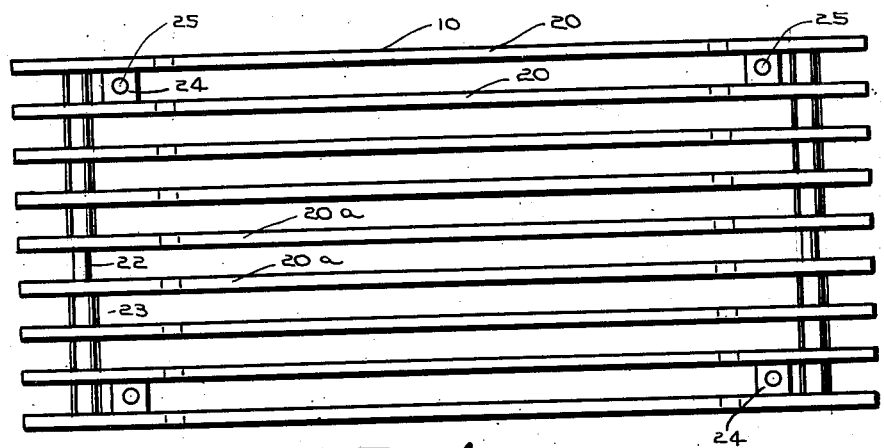
Figure 4 is a plan view of the upper member.
Figure 5:
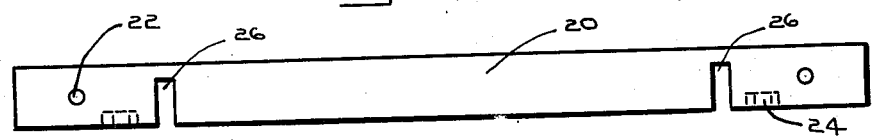
Figure 5 is a side elevational view of the same.

The upper clamping member 10 is similar to the lower clamping member. It is shown in detail in Figures 4 and 5. The upper clamping member is composed of a grid of bars 20 and 20a of rectangular cross-section. However, the bars 20 and 20a are of relatively greater vertical extent than the bars 11 in the lower clamping member. The bars 20 and 20a are provided with aligned apertures 21 extending therethrough to receive a pair of transverse rods 22 for holding the bars together. The bars are spaced apart by means of short cylindrical sleeves 23 in the same manner as in the lower clamping member. It will be noted that two sleeves are omitted between the two adjacent bars 20a at each end of the clamping member 10. The rods 22 receive the free ends of the hooks 27 to hold the clamping members together.

Adjacent each corner of the upper clamping member are brackets 24. The brackets 24 are preferably welded to the outermost pairs of bars 20 and are provided with apertures 25 to receive the locating pins 19 on the lower clamping member.

The bars 20 and 20a are notched at 26 to receive the upturned flanges 13 on the plate 12 when the latter is clamped between the clamping members.

The sizes and spacing of the bars 15, 15a, 20 and 20a are such that the open area through the grids is at least 50% of the total overall area of the grids, thereby permitting the heat from a gas burner or burners to be transmitted to the parts to be soldered. Also, the contact area between the clamping members and the work is relatively small, thereby decreasing the cooling effect of the bars 15, 15a, 20 and 20a.

As above mentioned, it is preferable that the bars 15 and 15a of the lower clamping member 11 be of considerably less vertical extent than the corresponding dimension of the bars 20 and 20a in the upper clamping member. It is not essential that there be such a great difference. It is, however, necessary when using the clamping apparatus in the soldering machine of my aforesaid copending application that the lower clamping member 11 be relatively flexible, while the upper clamping member 10 be quite rigid. In order to conserve material as well as to decrease the weight of the clamping members, the two are made of different vertical extents.

One clamping member is rigid while the other is relatively flexible in order that differences in the thickness of the plate 12, as well as differences in the diameter of the conduit 14 at various points, will not cause the tube to be crushed when the assembled clamping members and parts to be soldered are passed between the rolls of the aforementioned soldering machine. In addition, the flexibility of the one clamping member insures good contact between the parts to be soldered together.

The two parts of the clamping apparatus and the parts to be soldered together are assembled by first laying the plate 12 on top of the lower clamping member 11 with the flanges 13 extending upwardly. A coating of flux is painted on the upper surface of the plate 12 and one or more strips of sheet solder 29 are laid upon the plate 12. The strips 21 are coated with flux and the evaporator tube 14 is then placed in position upon the strips of solder. The upper clamping member 11 is placed in position with the notches 26 receiving the flanges 13 and the apertures 25 in the brackets 24 receiving the locating pins 19. The hooks 27 are then hooked over the rods 22.

In that condition heat can be applied to the parts to be soldered by passing the entire assembly through the soldering machine described in my copending application or in any other suitable way, such as by playing a jet of flame over the assembly, or by placing the same in an electric oven. After the solder has been melted the parts may be cooled by jets of water or by being permitted to cool in the open air. After the solder has been solidified the clamping members can be disassembled and the soldered parts removed therefrom.

From the foregoing it will be seen that the present invention provides a novel apparatus for holding the parts together while being soldered. The grid construction of the clamping members permits ready application of heat and also permits access to the soldered parts of water jets or a stream of air for cooling the same.

The scope of the invention is indicated in the appended claims.

I claim:

1. Apparatus for use in soldering metal parts together comprising upper and lower clamping members, said upper clamping member comprising a plurality of relatively rigid bars, said bars being of greater thickness perpendicular to the plane than width parallel to the plane of the clamping member, and means connecting said bars together in spaced apart parallel relationship, said lower clamping member comprising a plurality of relatively flexible bars of substantially less thickness perpendicular to the plane of the clamping members than the first mentioned bars and of substantially the same width parallel to said plane as said first mentioned bars, and means connecting the bars of said lower clamping member together in spaced apart parallel relationship to each other, and means on the clamping members for securing said members in spaced relationship, one member overlying the other.

2. Apparatus for use in soldering metal parts together comprising upper and lower clamping members, said upper clamping member comprising a plurality of relatively rigid bars and means connecting said bars together in spaced apart parallel relationship, said lower clamping member comprising a plurality of bars and means connecting said bars together in spaced apart parallel relationship to each other, said bars being of substantially less cross-sectional area than the first mentioned bars, whereby the upper clamping member is relatively rigid and the lower clamping member is relatively flexible in a direction toward and away from said upper clamping member, and means on the clamping members for securing said members in spaced relationship, one member overlying the other.

3. Apparatus of the character described in claim 2 wherein the means for securing the clamping members in spaced relationship comprises hooks pivotally connected at one end to one of said clamping members and engageable with the other clamping member.

4. Apparatus of the character described in claim 2 wherein the clamping members are composed of parallel bars and the spaces between said bars constitute more than one-half of the overall area of the clamping members.

EARL E. NOFZINGER.

References Cited in the file of this patent

UNITED STATES PATENTS

| Number | Name | Date |
|---|---|---|
| 206,193 | Perkins | July 23, 1878 |
| 319,139 | Seward | June 2, 1885 |
| 2,236,952 | Arentsen | Apr. 1, 1941 |
| 2,443,574 | Burns | June 15, 1948 |
| 2,451,783 | Sweeney | Oct. 19, 1948 |
| 2,554,297 | Crossman | May 22, 1951 |